(12) United States Patent
Fang et al.

(10) Patent No.: US 7,466,508 B2
(45) Date of Patent: Dec. 16, 2008

(54) IMPEDANCE-MATCHED WRITE CIRCUIT WITH SHUNTED MATCHING RESISTOR

(75) Inventors: Hao Fang, Savage, MN (US); Cameron C. Rabe, Inver Grove Heights, MN (US)

(73) Assignee: Agere Systems Inc., Allentown, PA (US)

( * ) Notice: Subject to any disclaimer, the term of this patent is extended or adjusted under 35 U.S.C. 154(b) by 670 days.

(21) Appl. No.: 10/776,701

(22) Filed: Feb. 11, 2004

(65) Prior Publication Data
US 2005/0174668 A1    Aug. 11, 2005

(51) Int. Cl.
G11B 5/02    (2006.01)
(52) U.S. Cl. .................................................. 360/68
(58) Field of Classification Search ................. None
See application file for complete search history.

(56) References Cited
U.S. PATENT DOCUMENTS 6,121,800 A     9/2000  Leighton et al. ............ 327/110
6,184,727 B1 *  2/2001  Price, Jr. .................... 327/108
6,236,247 B1 *  5/2001  Ngo ........................... 327/110
6,512,646 B1 *  1/2003  Leighton et al. ............. 360/46

* cited by examiner

*Primary Examiner*—Daniell L Negrón
(74) *Attorney, Agent, or Firm*—Ryan, Mason & Lewis, LLP

(57) ABSTRACT

An impedance matched write circuit is provided that shunts one or more matching resistors. The impedance matched write circuit includes an interconnect for connecting to a write head and at least one resistor between a control voltage and the interconnect for impedance matching to the interconnect. A transistor can be connected across the resistor to shunt current that would otherwise pass through the resistor during an overshoot mode. The transistor may be a PMOS transistor or a combination of PMOS and NMOS transistors. A gate voltage of the transistor is controlled by a source such that the transistor is turned on in an overshoot mode and turned off during a steady state mode.

21 Claims, 7 Drawing Sheets

800

IMPEDANCE-MATCHED WRITE CIRCUIT WITH SHUNTED MATCHING RESISTOR

FIELD OF THE INVENTION

The present invention relates generally to drivers for write heads of magnetic disk drives, and more particularly, to write head drivers having impedance matching characteristics.

BACKGROUND OF THE INVENTION

A typical write circuit generates a square wave current pattern through the write head, with each current pulse being composed of a rise time portion, an overshoot portion, and a steady state portion. The overshoot portion represents the portion of the pulse where the absolute value of the current exceeds the absolute value of the steady state current. For example, where the steady state current is 40 mA, the overshoot current may reach a peak of 125 mA. The rise time is generally defined as the time that it takes the current to change from 10% to 90% of its steady state current, as it swings from one direction to the other. Thus, for a write head driver programmed to generate a 40 mA steady state write current, the rise time is defined as the time required for the current in the write head to change from −32 mA to +32 mA, and vice versa.

There have been many improvements to conventional write circuits to enhance their performance. These improved current-switching write circuits, however, are still unable to achieve impedance matching to the interconnect, since such impedance matching would require a small resistor in parallel with the write head which would shunt the write current away from the write head during operation of the circuit and thereby render the circuit inoperable. The lack of impedance matching results in pattern dependent distortion which limits the performance of the write circuit.

A number of techniques have been proposed or suggested to ensure impedance matching between the write circuit and the interconnect, in order to reduce pattern dependent distortion. U.S. Pat. No. 6,512,646 to Leighton et al., incorporated by reference herein, discloses an impedance matched write circuit that employs current sources that supply current during an overshoot mode that does not go through the matching resistor. U.S. Pat. No. 6,121,800 to Leighton et al., incorporated by reference herein, discloses an impedance matched write driver circuit in which a voltage-mode writer is arranged in parallel with an impedance-matched writer to ensure that the maximum available voltage is delivered to the head pins.

When impedance matched writers go into an overshoot mode, as much current and voltage as possible should be launched into the interconnect. For series terminated matched writers, this incurs a voltage drop penalty across the matching resistor. However, during the overshoot duration, matching is not necessary. A need therefore exists for a matching resistor in a write head that can be shunted to reduce the voltage drop across the matching resistor and deliver more voltage launch to the interconnect.

SUMMARY OF THE INVENTION

Generally, an impedance matched write circuit is provided that shunts one or more matching resistors. The impedance matched write circuit includes an interconnect for connecting to a write head and at least one resistor between a control voltage and the interconnect for impedance matching to the interconnect. In one implementation, a transistor is connected across the resistor to shunt current that would otherwise pass through the resistor during an overshoot mode. The transistor may be a P-Channel Metal Oxide Silicon (PMOS) transistor or a combination of PMOS and NMOS transistors. A gate voltage of the transistor is controlled by a source such that the transistor is turned on in an overshoot mode and turned off during a steady state mode. An impedance matched write circuit in accordance with the present invention may optionally include a current booster, such as those disclosed in U.S. Pat. No. 6,512,646 to Leighton et al.

A more complete understanding of the present invention, as well as further features and advantages of the present invention, will be obtained by reference to the following detailed description and drawings.

DETAILED DESCRIPTION

Figure 1:
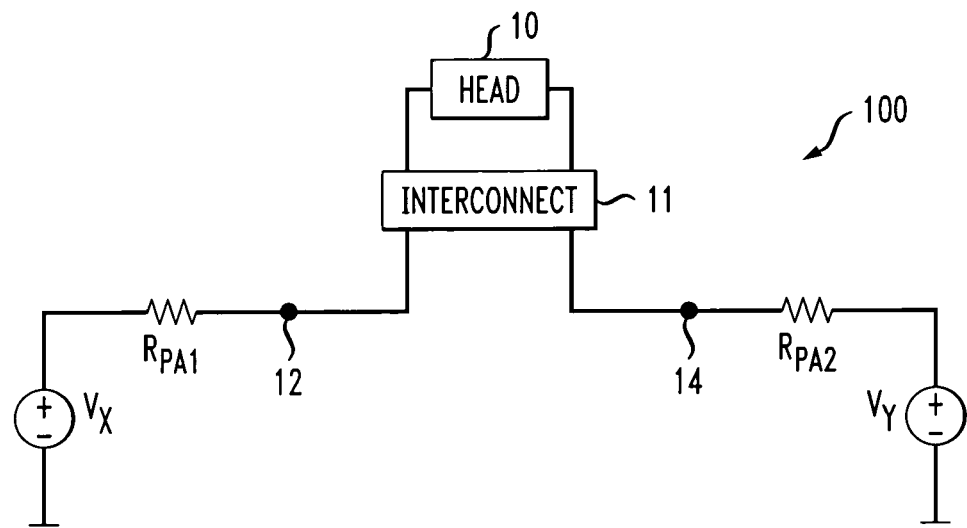
FIG. 1 is a schematic diagram of a conventional impedance-matched write circuit.

FIG. 1 is a schematic diagram of a conventional impedance-matched write circuit 100. As previously indicated, an interconnect 11 connects the writer circuit 100 to the write head 10. Typically, the writer circuit 100 is part of an integrated circuit preamplifier chip mounted to the proximal end of an actuator arm(s) on the E-block, and the interconnect cable extends along the actuator arm(s) to the write head(s). Hence, the interconnect cable is a transmission line and generally has a length of about 2 inches. The impedance of the interconnect cable is spread somewhat evenly along its length. In order to reduce or eliminate pattern dependent distortion in the operation of the writer circuit 100, the write circuit 100 must be matched to the impedance of the interconnect cable.

As shown in FIG. 1, the writer circuit 100 includes ideal voltage sources $V_X$ and $V_Y$ connected through series resistors $R_{PA1}$ and $R_{PA2}$ to pins 12 and 14 on opposite sides of interconnect 11 for connection to head 10. Resistors $R_{PA1}$ and $R_{PA2}$ are selected for impedance matching to interconnect 11, with each of those resistors having a value equal to half of the characteristic impedance of interconnect 11.

According to the Thevenin principle, the transient voltage ($V_{TL}$) delivered by the writer to the interconnect is represented by:

$$V_{TL} = V_{AVAIL} \frac{Z_{TL}}{2R_{PA} + Z_{TL}} + I_w \left( \frac{2R_{PA}(Z_{TL} - R_S)}{2R_{PA} + Z_{TL}} \right) \quad (1)$$

where $R_{PA}$ is the impedance of the preamplifier series resistors, $Z_{TL}$ is the interconnect impedance, $R_S$ is the resistance associated with the head (which is typically quite small), $I_W$ is the write current and $V_{AVAIL}$ is the voltage swing between the positive and negative rails of the circuit minus some voltage determined by head room constraints. Where the resistance of the Thevenin writer is set to properly match the impedance of the interconnect, i.e., $$R_{PA} = \frac{Z_{TL}}{2}, \quad (2)$$

then $$V_{TL} = \frac{V_{AVAIL}}{2} + I_w \left( R_{PA} - \frac{R_S}{2} \right). \quad (3)$$

For typical component values, $V_{TL}$ is approximately equal to two-thirds of $V_{AVAIL}$. If the preamplifier resistances are each set to less than half of the differential impedance of the interconnect, even more voltage would be delivered to the interconnect, but the interconnect would not be brought exactly to steady-state due to improper impedance matching.

Figure 2:
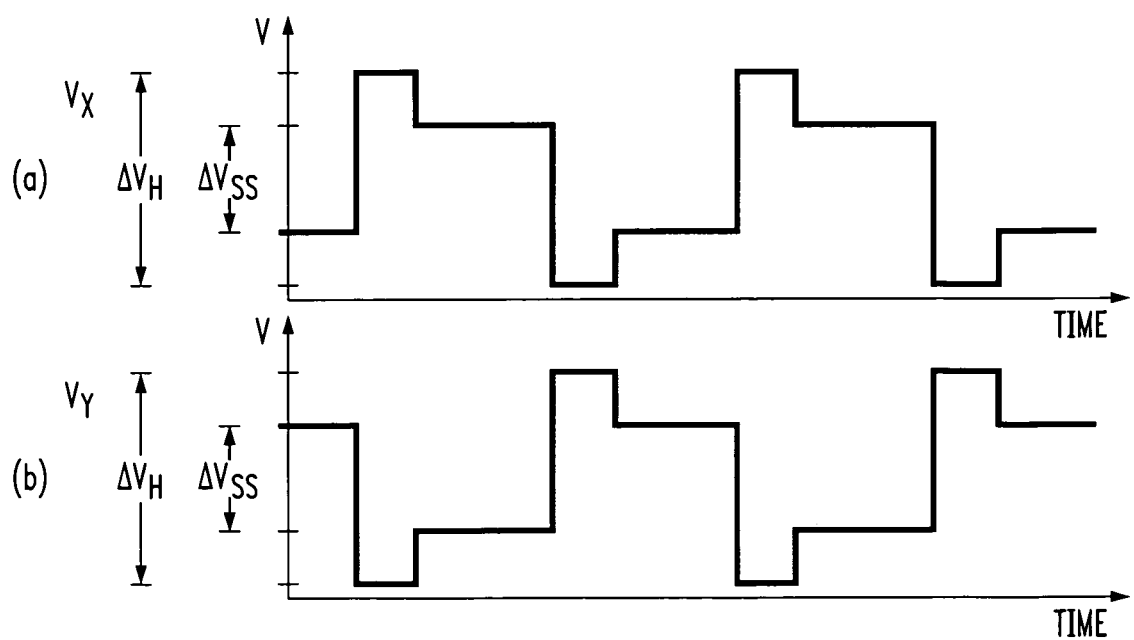
FIG. 2 illustrates control waveforms utilized in the conventional impedance matched write circuit of FIG. 1.

FIG. 2 illustrates control waveforms utilized in the conventional impedance matched write circuit 100 of FIG. 1. Each pulse of control signals $V_X$ and $V_Y$ may be expressed as a transition portion and a steady state portion. The transition portion of the pulse generates an excursion ($\Delta V_H$) limited by the supply voltage and the head room constraints on the circuit. The steady state voltage difference ($\Delta V_{SS}$) sets the steady state write current as follows:

$$I_w = \frac{\Delta V_{SS}}{R_S + 2R_{PA}} \quad (4)$$

Figure 3:
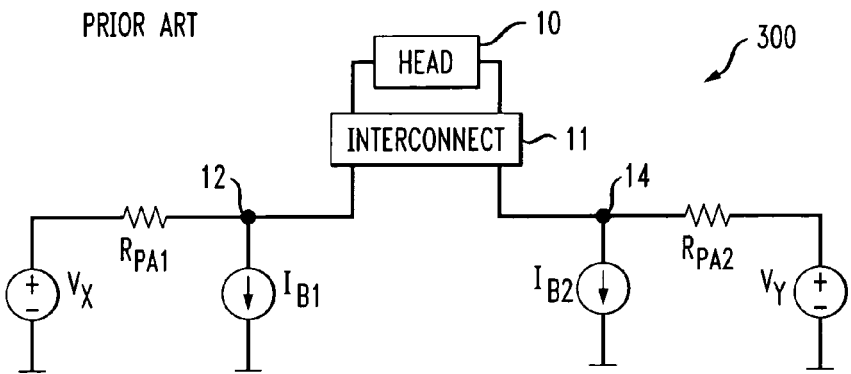
FIG. 3 is a schematic diagram of an impedance-matched write circuit with current boost as disclosed in U.S. Pat. No. 6,512,646 to Leighton et al.
Figure 4:
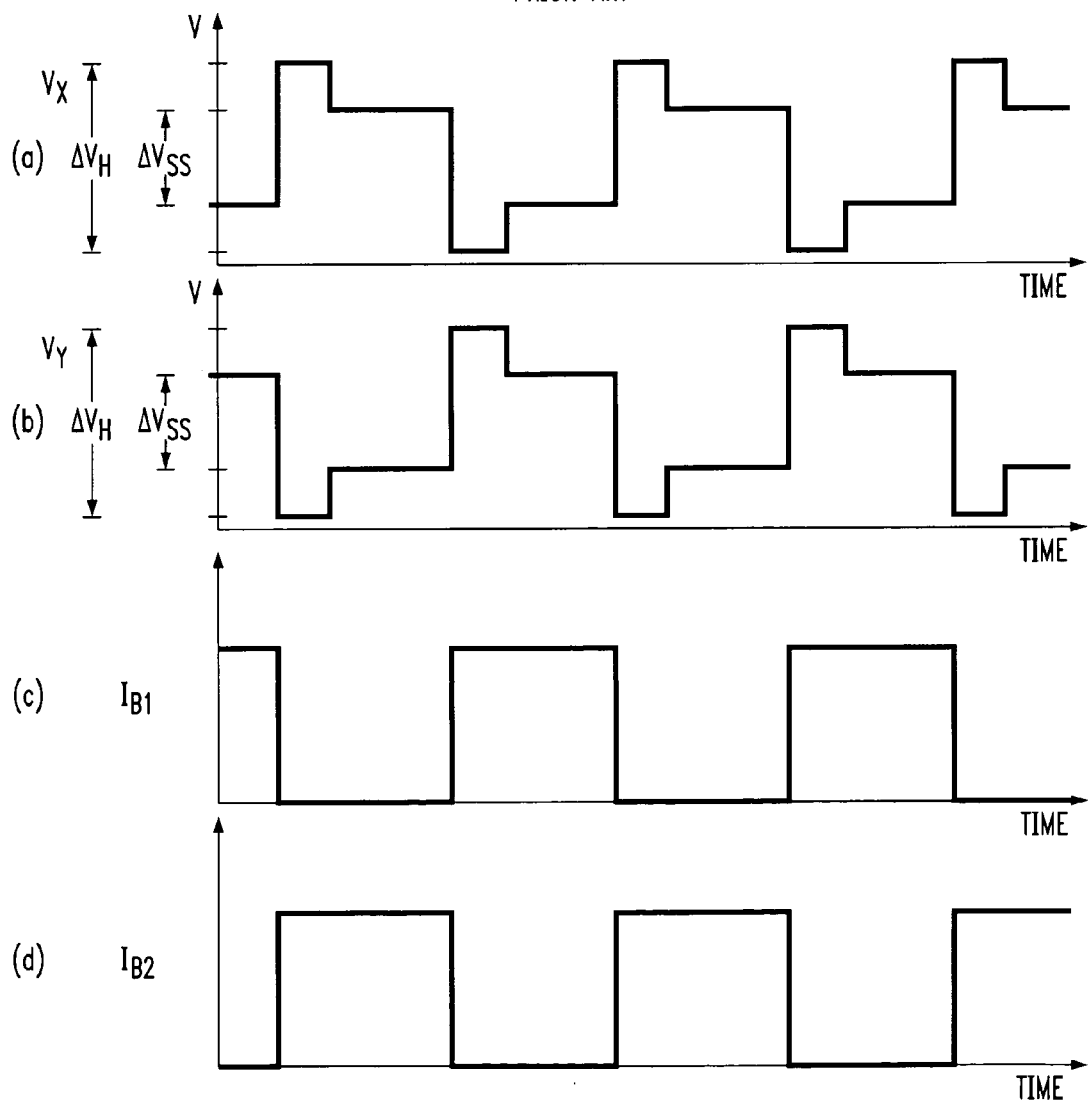
FIG. 4 illustrates control waveforms utilized in the impedance-matched write circuit of FIG. 3.

FIG. 3 is a schematic diagram of an impedance-matched write circuit 300 with current boost as disclosed in U.S. Pat. No. 6,512,646 to Leighton et al. The impedance-matched write circuit 300 is similar to the impedance-matched write circuit 100 of FIG. 1, except that switched current sources $I_{B1}$ and $I_{B2}$ are connected to respective pins 12 and 14 to achieve a slight improvement in the voltage that can be delivered to interconnect 11. FIG. 4 illustrates control waveforms utilized in the impedance-matched write circuit 300 of FIG. 3. Current sources $I_{B1}$ and $I_{B2}$ are activated to pull down on the pin that is driven low during the transient (the negative interconnect pin), resulting in increased voltage ($\Delta V_H$) delivered to interconnect 11. The maximum current that can be pulled from the interconnect pin is equal to the transient current into the head. The resulting voltage that is then applied to the interconnect is given by:

$$V_{TL} = V_{AVAIL} \frac{Z_{TL}}{R_{PA} + Z_{TL}} + I_w \frac{R_{PA}(Z_{TL} - R_S)}{R_{PA} + Z_{TL}} \quad (5)$$

If the preamplifier writer resistance is sized to properly match the differential impedance of the interconnect, the voltage supplied to the interconnect by the preamplifier is given by:

$$V_{TL} = \frac{2}{3} V_{AVAIL} + I_w \frac{Z_{TL} - R_s}{3} \quad (6)$$

Figure 5:
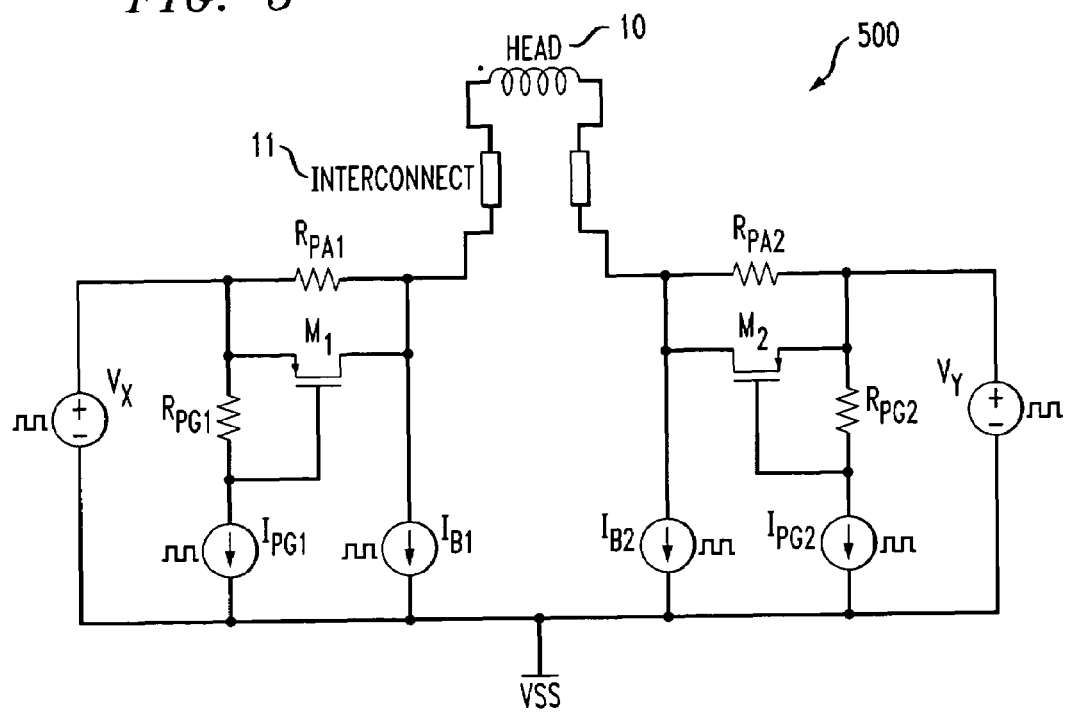
FIG. 5 is a schematic diagram of an impedance-matched write circuit incorporating features of the present invention.

FIG. 5 is a schematic diagram of an impedance-matched write circuit 500 incorporating features of the present invention. The impedance-matched write circuit 500 is similar to the impedance-matched write circuit 300 of FIG. 3. As shown in FIG. 5, the impedance-matched write circuit 500 includes a pair of transistors, M1, M2, across the output driver series impedance matching resistors $R_{PA1}$, $R_{PA2}$, with the drain and source connections of the transistors M1, M2, connected to each side of the matching resistor $R_{PA1}$, $R_{PA2}$. The gate is then controlled by a source such that the transistors, M1, M2 are turned on in an overshoot mode and turned off during a steady state mode. In the implementation shown in FIG. 5, the transistors M1, M2 may be embodied as P-Channel Metal Oxide Silicon (PMOS) transistor devices. In an implementation without the current boost, $I_{B1}$ and $I_{B2}$, the transistors M1, M2 may be embodied as a combination of PMOS and N-Channel Metal Oxide Silicon (NMOS) transistor devices, as discussed further below in conjunction with FIGS. 9 and 10.

According to one aspect of the invention, the PMOS transistors M1, M2 shunt current that would otherwise pass through the matching resistors $R_{PA1}$, $R_{PA2}$ during overshoot, thereby reducing the internal voltage drop and maximizing the voltage launch to the interconnect. The shunting performed by the PMOS transistors M1, M2 allows for a large voltage launch comparable to non-matched writers during overshoot but reverts back to impedance matched style during steady state portion of the waveform with the use of standard components (no PNP or high breakdown PMOS required). The shunting technique of the present invention is advantageous over impedance matched writers since it is able to launch more voltage and current into the write head interconnect. The gate voltage source can be implemented, for example, using a resistor $R_{PG1}$, $R_{PG2}$, from the source to the gate and a current source $I_{PG1}$, $I_{PG2}$, from the gate to the negative supply voltage.

Figure 6:
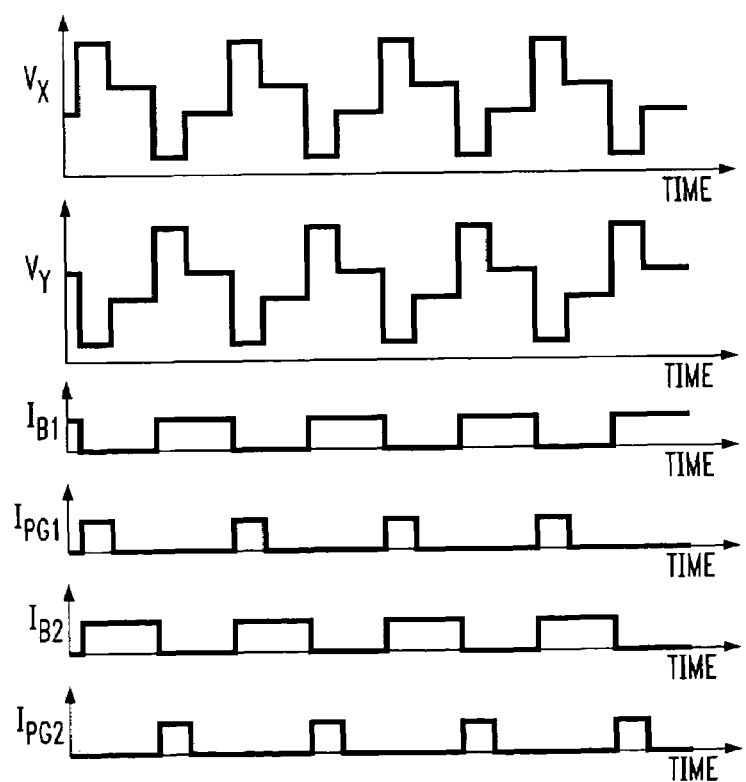
FIG. 6 illustrates the control waveforms utilized in the impedance-matched write circuit of FIG. 5.

FIG. 6 illustrates the control waveforms utilized in the impedance-matched write circuit 500 of FIG. 5. Current sources $I_{B1}$ and $I_{B2}$ are activated to pull down on the pin that is driven low during the transient (the negative interconnect pin), resulting in increased voltage ($\Delta V_H$) delivered to interconnect 11, in the same manner as described above in conjunction with FIG. 4. As shown in FIG. 6, the current sources $I_{PG1}$, $I_{PG2}$, are turned on during their respective overshoot mode and turned off during their respective steady state to get the desired control voltages.

The interconnect voltage with the PMOS shunt provided by the present invention then becomes:

$$V_{TL} = V_{AVAIL} \frac{Z_{TL}}{\left( Z_{TL} + \frac{R_{PA} Ron}{R_{PA} + Ron} \right)} + I_w \left( \frac{R_{PA} Ron}{R_{PA} + Ron} \right) \frac{(Z_{TL} - R_S)}{\left( Z_{TL} + \frac{R_{PA} Ron}{R_{PA} + Ron} \right)} \quad (7)$$

where $R_{on}$ represents the on resistance of the PMOS devices, M1, M2. If the PMOS device is large, a fairly low $R_{on}$ is obtained that is in parallel with the matching resistors, M1, M2.

The transmission line voltage, $V_{TL}$, delivered during an overshoot mode using the PMOS shunt device only on the high side is expressed as follows:

$$V_{TL} = V_{AVAIL} \frac{Z_{TL}}{\left(Z_{TL} + \frac{R_{PA}R_{on}}{R_{PA}+R_{on}} + R_{PA}\right)} + \quad (8)$$

$$I_W\left(R_{PA} + \frac{R_{PA}R_{on}}{R_{PA}+R_{on}}\right)\frac{(Z_{TL}-R_S)}{\left(Z_{TL} + \frac{R_{PA}R_{on}}{R_{PA}+R_{on}} + R_{PA}\right)}$$

Similarly, the transmission line voltage, $V_{TL}$, delivered during an overshoot mode when shunt devices embodied as a combination of PMOS and NMOS devices are used on both the high and low sides, is expressed as follows:

$$V_{TL} = \quad (9)$$

$$V_{AVAIL}\frac{Z_{TL}}{\left(Z_{TL}+2\frac{R_{PA}R_{on}}{R_{PA}+R_{on}}\right)} + I_w\left(2\frac{R_{PA}R_{on}}{R_{PA}+R_{on}}\right)\frac{(Z_{TL}-R_S)}{\left(Z_{TL}+2\frac{R_{PA}R_{on}}{R_{PA}+R_{on}}\right)}$$

Assume that $R_{on}$ is 10 ohms, $Z_{TL}$ is 70 ohms, $R_{PA}$ is 35 ohms, $R_S$ is 10 ohms and $V_{AVAIL}$ is 8 volts. Thus, according to Equation (3), $V_{TL}$ in an impedance matched writer would be 5.2V. According to Equation (6), $V_{TL}$ in an impedance matched writer with current boost would be 6.1 V. According to Equation (7), $V_{TL}$ in an impedance matched writer with current boost and PMOS shunt on high side would be 7.5V (almost the entire 8 volts that is available). According to Equation (9), $V_{TL}$ in an impedance matched writer with current boost and with PMOS and NMOS shunting on both high and low sides would be 7.0V.

Figure 9:
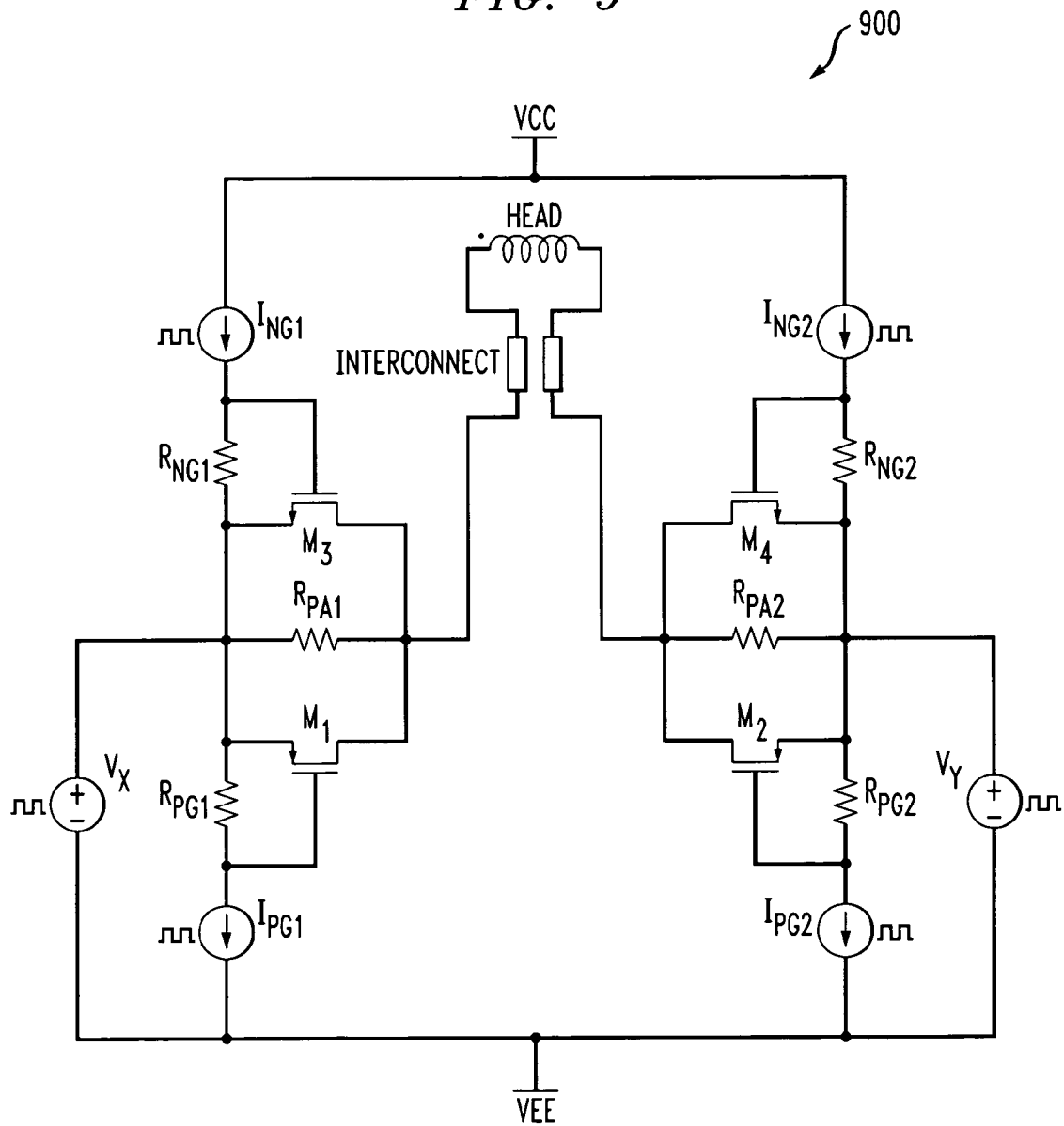
FIG. 9 is a schematic diagram of an impedance-matched write circuit incorporating features of the present invention.

It is noted that the present invention may also be incorporated into impedance-matched write circuits with dual current boost, such as those illustrated in FIG. 9 of U.S. Pat. No. 6,512,646, as would be apparent to a person of ordinary skill in the art.

Figure 7:
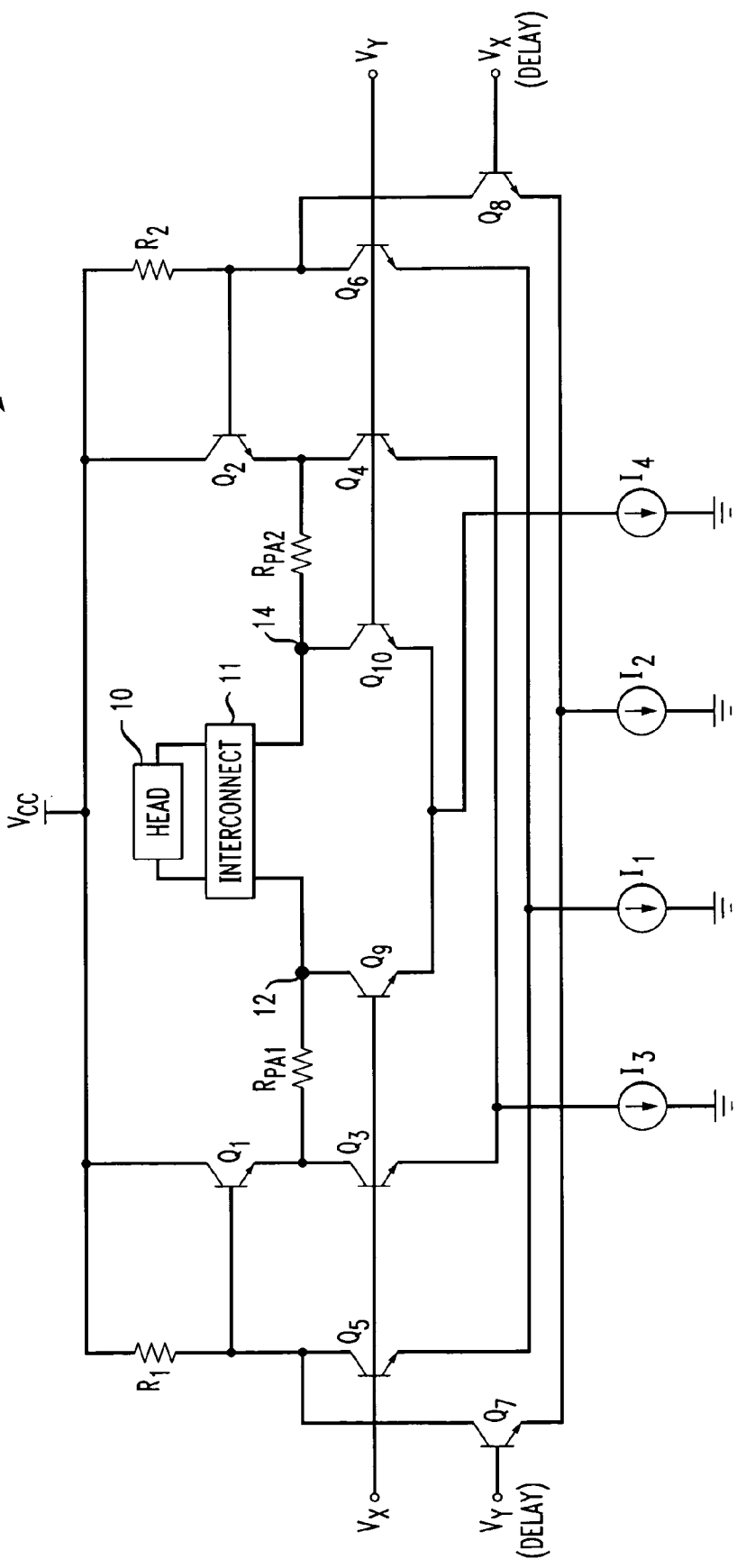
FIG. 7 is a schematic diagram of a conventional circuit for realizing an impedance-matched write circuit with current boost using NPN transistors.

FIG. 7 is a schematic diagram of a conventional circuit 700 for realizing an impedance-matched write circuit with current boost using NPN transistors. Again, the complex control waveforms for $V_X$ and $V_Y$ are actually generated by simple high and low logic signals for $V_X$ and $V_Y$ and delayed versions of those same high and low logic signals, $V_X$ (delay) and $V_Y$ (delay). The delayed signals can be generated by fixed or programmable delay circuitry.

As shown in FIG. 7, transistor Q1 has a collector connected to the positive supply voltage (e.g., $V_{CC}$), and transistor Q2 also has a collector connected to the positive supply voltage. Preamplifier resistor $R_{PA1}$ is connected between the emitter of transistor Q1 and interconnect pin 12 and preamplifier resistor $R_{PA2}$ is connected between the emitter of transistor Q2 and interconnect pin 14. Resistor R1 is connected between the positive supply voltage and the base of transistor Q1, and resistor R2 is connected between the positive supply voltage and the base of transistor Q2. Transistor Q3 has a collector connected to the emitter of transistor Q1, and has a base connected to control signal $V_X$. Transistor Q4 has a collector connected to the emitter of transistor Q2, and has a base connected to control signal $V_Y$.

The emitters of transistors Q3 and Q4 are connected together, and then are connected through current source I3 to a negative voltage level (e.g., ground). Transistor Q5 has a collector connected to the base of transistor Q1, and has a base connected to control signal $V_X$. Transistor Q6 has a collector connected to the base of transistor Q2, and has a base connected to control signal $V_Y$. The emitters of transistors Q5 and Q6 are connected together, and then are connected through current source I1 to the negative voltage level. Transistor Q7 has a collector connected to the base of transistor Q1, and has a base connected to control signal $V_Y$ (delay). Transistor Q8 has a collector connected to the base of transistor Q2, and has a base connected to control signal $V_X$ (delay). The emitters of transistors Q7 and Q8 are connected together, and then are connected through current source I2 to the negative voltage level.

In order to implement a current boost, transistor Q9 is provided with a collector connected to interconnect pin 12, and with a base connected to control signal $V_X$. Transistor Q10 is provided with a collector connected to interconnect pin 14, and with a base connected to control signal $V_Y$. The emitters of transistors Q9 and Q10 are connected together, and then are connected through current source I4 to the negative voltage level.

Upon the occurrence of a transition, such as $V_X$ switching from low to high and $V_Y$ switching from high to low, transistor Q9 is turned on and transistor Q1 is turned off. Therefore, the transient write current $I_W$ through head 10 is governed by the following equation:

$$(I_1+I_2)R_1=I_w(Z_{TL}-R_S)+I_4(Z_{TL}+R_{PA}).$$

Transistor Q9 remains on and transistor Q10 remains off during the steady state portion of the waveform as well, with the steady state write current $I_W$ through head being governed by the following equation:

$$(I_1-I_2)R_1=I_w(2R_{PA}+R_S)-I_4R_{PA}.$$

There is one additional condition imposed by the addition of the boost circuitry of FIG. 7, which is a limit on the current that can be delivered to interconnect 11 before saturating the Q9-Q10 differential pair transistors. This condition is represented by the following equation:

$$I_4(Z_{TL}+R_{PA})=V_{AVAIL}-I_w(Z_{TL}-R_S)$$

Given these three conditions with the three unknown currents (I1, I2 and I4, since I3 needs only to be greater than the write current through head 10 minus the value of boost current I4), proper values of current sources I1, I2 and I4 may be chosen.

As a result of the current boost circuitry shown in the circuit of FIG. 7, current is pulled from the low interconnect pin immediately following a transition in the control signals. This causes the voltage at the interconnect pin to drop even lower than it would without the boost circuitry, which results in a larger voltage delivered to interconnect 11 and thus reduces the time required for the write current to switch directions through head 10 upon the occurrence of a transition.

Figure 8:
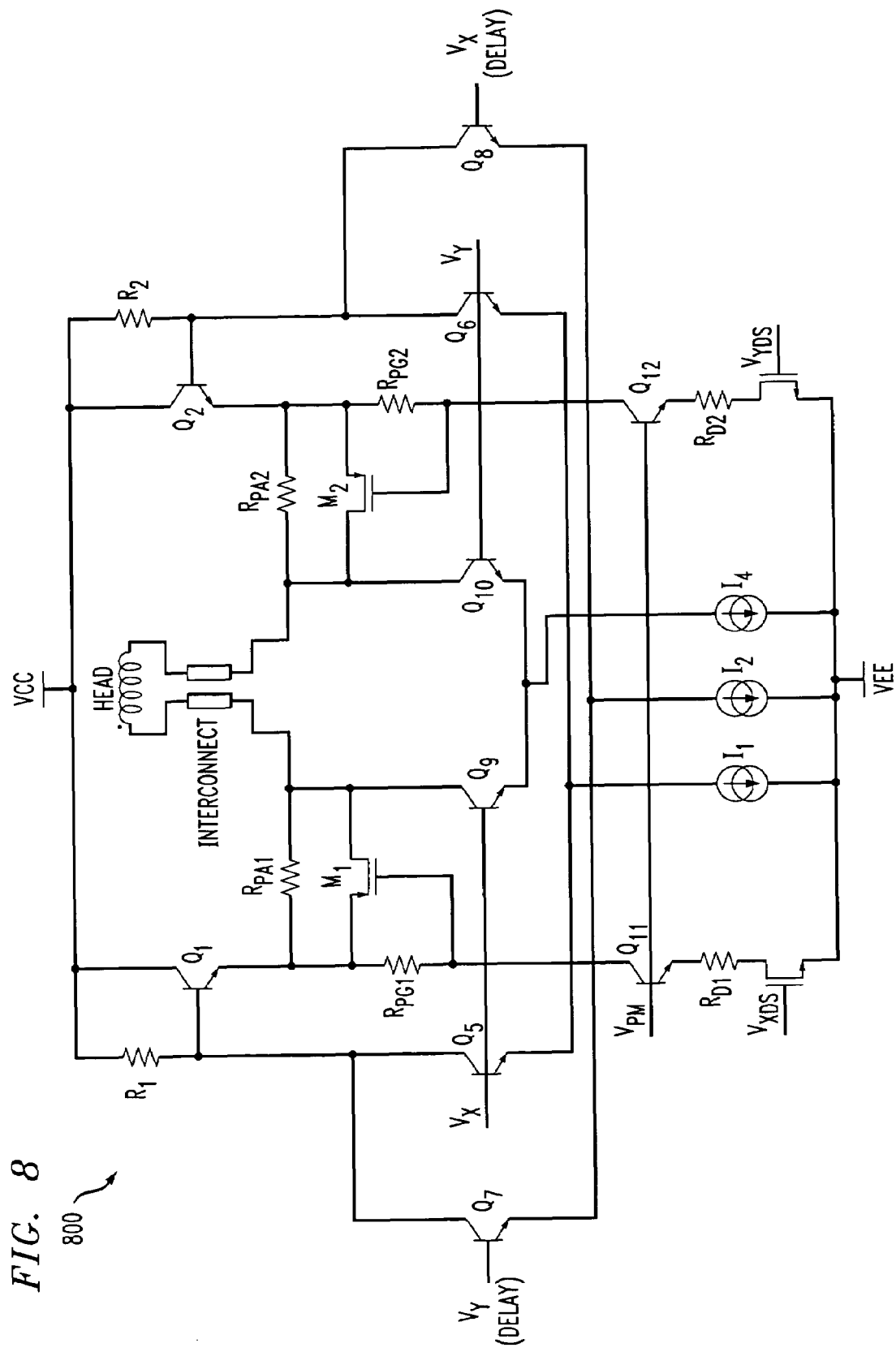
FIG. 8 is a schematic diagram of an impedance-matched write circuit in accordance with the present invention using NPN transistors.

FIG. 8 is a schematic diagram of an impedance-matched write circuit 800 in accordance with the present invention using NPN transistors and PMOS devices. The impedance-matched write circuit 800 is similar to the impedance-matched write circuit 700 of FIG. 7. As shown in FIG. 8, the impedance-matched write circuit 800 includes a pair of transistors, M1, M2, across the output driver series impedance matching resistors $R_{PA1}$, $R_{PA2}$, with the drain and source connections of the transistors M1, M2, connected to each side of the matching resistor $R_{PA1}$, $R_{PA2}$, in a similar manner to FIG. 5. The transistors Q3 and Q4 and the current source I3 of FIG. 7 are not shown in FIG. 8 in order to simplify the illustration.

FIG. 9 is a schematic diagram of an impedance-matched write circuit 900 incorporating features of the present invention. The impedance-matched write circuit 900 is similar to the impedance-matched write circuit 500 of FIG. 5, without the current boost, $I_{B1}$ and $I_{B2}$. In the implementation shown in FIG. 9, the shunting transistors comprise the PMOS transistors M1, M2 of FIG. 5 and NMOS transistor devices M3 and M4. The NMOS transistor devices M3 and M4 are controlled by gate control elements $I_{NG1}$, $R_{NG1}$, $I_{NG2}$ and $R_{NG2}$.

Thus, as shown in FIG. 9, the impedance-matched write circuit 900 includes a pair of PMOS transistors, M1, M2, and a pair of NMOS transistors, M3, M4, across the output driver series impedance matching resistors $R_{PA1}$, $R_{PA2}$, with the drain and source connections of the transistors M1, M2, M3, M4 connected to each side of the matching resistor $R_{PA1}$, $R_{PA2}$. The gates of each transistor are then controlled by a gate control source, as discussed below in conjunction with FIG. 10.

Figure 10:
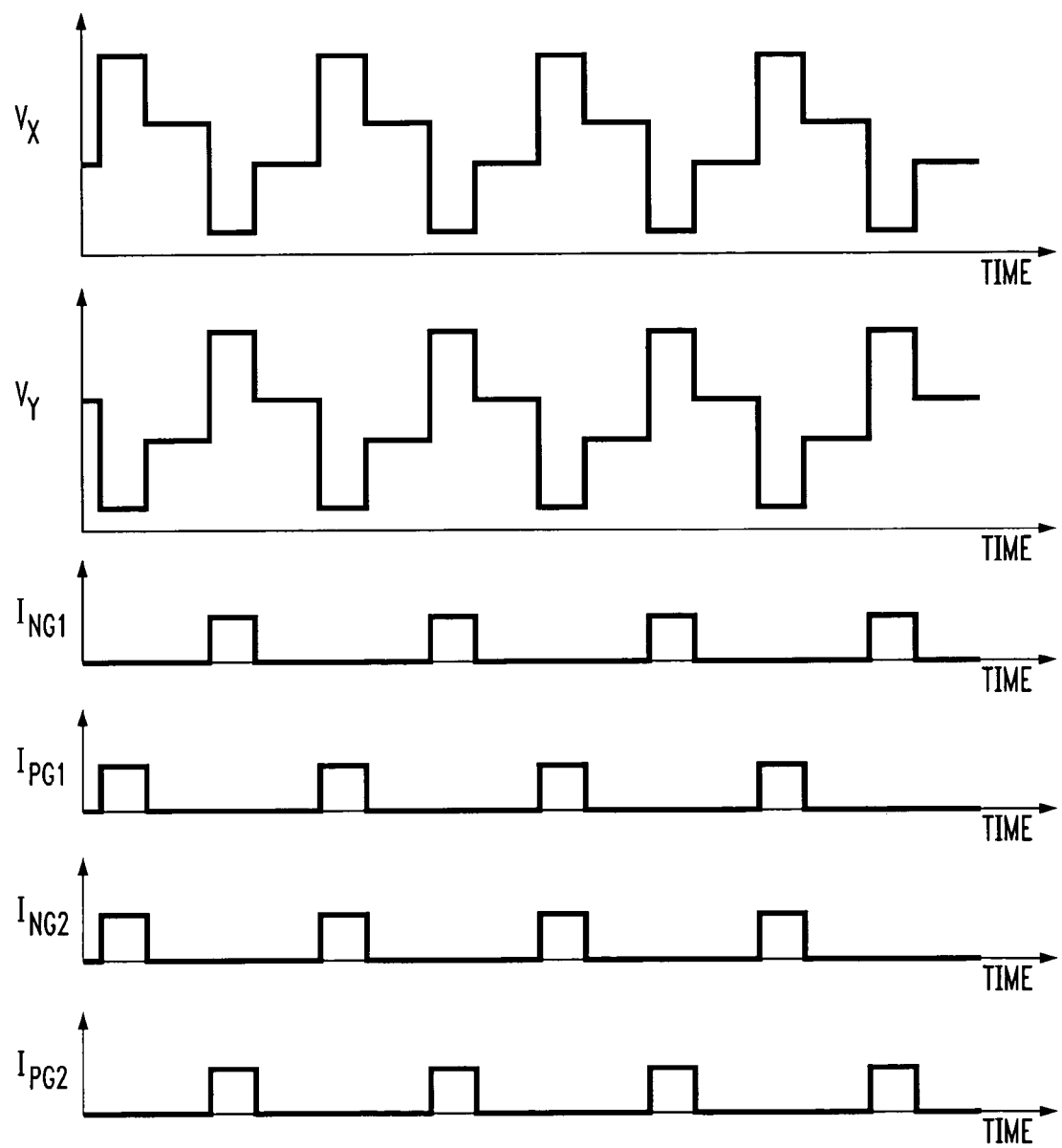
FIG. 10 illustrates the control waveforms utilized in the impedance-matched write circuit of FIG. 9.

According to one aspect of the invention, the transistors M1, M2, M3, M4 shunt current that would otherwise pass through the matching resistors $R_{PA1}$, $R_{PA2}$ during overshoot, thereby reducing the internal voltage drop and maximizing the voltage launch to the interconnect. FIG. 10 illustrates the control waveforms utilized in the impedance-matched write circuit 900 of FIG. 9. As shown in FIG. 10, the current sources $I_{PG1}$, $I_{PG2}$, are turned on during their respective overshoot mode and turned off during their respective steady state to get the desired control voltages. Similarly, the current sources $I_{NG1}$, $I_{NG2}$ are turned on during their respective overshoot mode and turned off during their respective steady state to get the desired control voltages.

The present invention recognizes that, with the proper arrangement of circuit components and the proper values chosen for those components, a sufficient transient voltage can be delivered to the interconnect 11 so that write current transitions may be achieved with a sufficiently low rise time for high performance applications. This recognition enables an impedance matched configuration of the write circuit to be employed, with the associated reduction of pattern dependent distortion, while providing excellent performance and low rise times as required by many high performance applications.

It is to be understood that the embodiments and variations shown and described herein are merely illustrative of the principles of this invention and that various modifications may be implemented by those skilled in the art without departing from the scope and spirit of the invention.

We claim:

1. An impedance matched write circuit, comprising:
    an interconnect for connecting to a write head;
    at least one resistor between a control voltage and said interconnect for impedance matching to said inter connect;
    a transistor circuit connected across said at least one resistor to shunt at least a portion of the current that would otherwise pass through said at least one resistor during an over shoot mode.

2. The impedance matched write circuit of claim 1, wherein said transistor circuit comprises a PMOS transistor.

3. The impedance matched write circuit of claim 1, wherein said transistor circuit comprises a combination of PMOS and NMOS transistors.

4. The impedance matched write circuit of claim 1, wherein drain and source connections of said transistor circuit are connected to each side of said at least one resistor.

5. The impedance matched write circuit of claim 1, wherein a gate voltage of said transistor circuit is controlled by a gate voltage source such that said transistor circuit is turned on in an overshoot mode.

6. The impedance matched write circuit of claim 1, wherein a gate voltage of said transistor circuit is controlled by a gate voltage source such that said transistor circuit is turned off during a steady state mode.

7. The impedance matched write circuit of claim 5, wherein said gate voltage source comprises a resistor between a source and a gate of said transistor circuit and a current source from said gate to a negative supply voltage.

8. The impedance matched write circuit of claim 7, wherein said current source is turned on during an over shoot mode.

9. The impedance matched write circuit of claim 7, wherein said current source is turned off during a steady state mode.

10. The impedance matched write circuit of claim 1, further comprising:
    a first current source at a first side of said interconnect when a voltage at the first side of the interconnect is low; and
    a second current source at a second side opposite the first side of the interconnect when a voltage at the second side of the interconnect is low.

11. Air impedance matched write circuit, comprising:
    an interconnect for connecting to a write head;
    at least one resistor between a control voltage and said interconnect for impedance matching to said interconnect; and
    means for shunting at least a portion of the current that would otherwise pass through said at least one resistor during an overshoot mode.

12. The impedance matched write circuit of claim 11, wherein said means for shunting current comprises a transistor circuit.

13. The impedance matched write circuit of claim 12, wherein said transistor circuit comprises a PMOS transistor.

14. The impedance matched write circuit of claim 12, wherein said transistor circuit comprises a combination of PMOS and NMOS transistors.

15. The impedance matched write circuit of claim 12, wherein drain and source connections of said transistor circuit are connected to each side of said at least one resistor.

16. The impedance matched write circuit of claim 12, wherein a gate voltage of said transistor circuit is controlled by a gate voltage source such that said transistor circuit is turned on in an over shoot mode.

17. A method for impedance matching in a write circuit, comprising the steps of:

connecting to a write head using an interconnect;

providing at least one resistor between a control voltage and said interconnect for impedance matching to said interconnect; and shunting using a transistor circuit connected across said at least one resistor to shunt at least a portion of the current that would otherwise pass through said at least one resistor during an overshoot mode.

18. The method of claim 17, wherein said shunting current step is performed by a transistor.

19. The method of claim 18, wherein said transistor comprises a PMOS transistor.

20. The method of claim 18, further comprising the step of connecting drain and source connections of said transistor to each side of said at least one resistor.

21. The method of claim 18, further comprising the step of controlling a gate voltage of said transistor by a gate voltage source such that said transistor is turned on in an overshoot mode.

* * * * *

UNITED STATES PATENT AND TRADEMARK OFFICE
CERTIFICATE OF CORRECTION

PATENT NO. : 7,466,508 B2  
APPLICATION NO. : 10/776701  
DATED : December 16, 2008  
INVENTOR(S) : Hao Fang Page 1 of 1

It is certified that error appears in the above-identified patent and that said Letters Patent is hereby corrected as shown below:

In claim 1, column 8, line 5-6, "inter connect" should be replaced by -- interconnect --.

In claim 1, column 8, line 10, "over shoot" should be replaced by -- overshoot --.

In claim 8, column 8, line 32, "over shoot" should be replaced by -- overshoot --.

In claim 16, column 8, line 65, "over shoot" should be replaced by -- overshoot --.

Signed and Sealed this  
Eighteenth Day of December, 2012

David J. Kappos  
*Director of the United States Patent and Trademark Office*